March 4, 1947. F. SHIPMAN 2,416,666
WINDOW MIRROR DISPLAY
Filed July 6, 1944 2 Sheets-Sheet 1
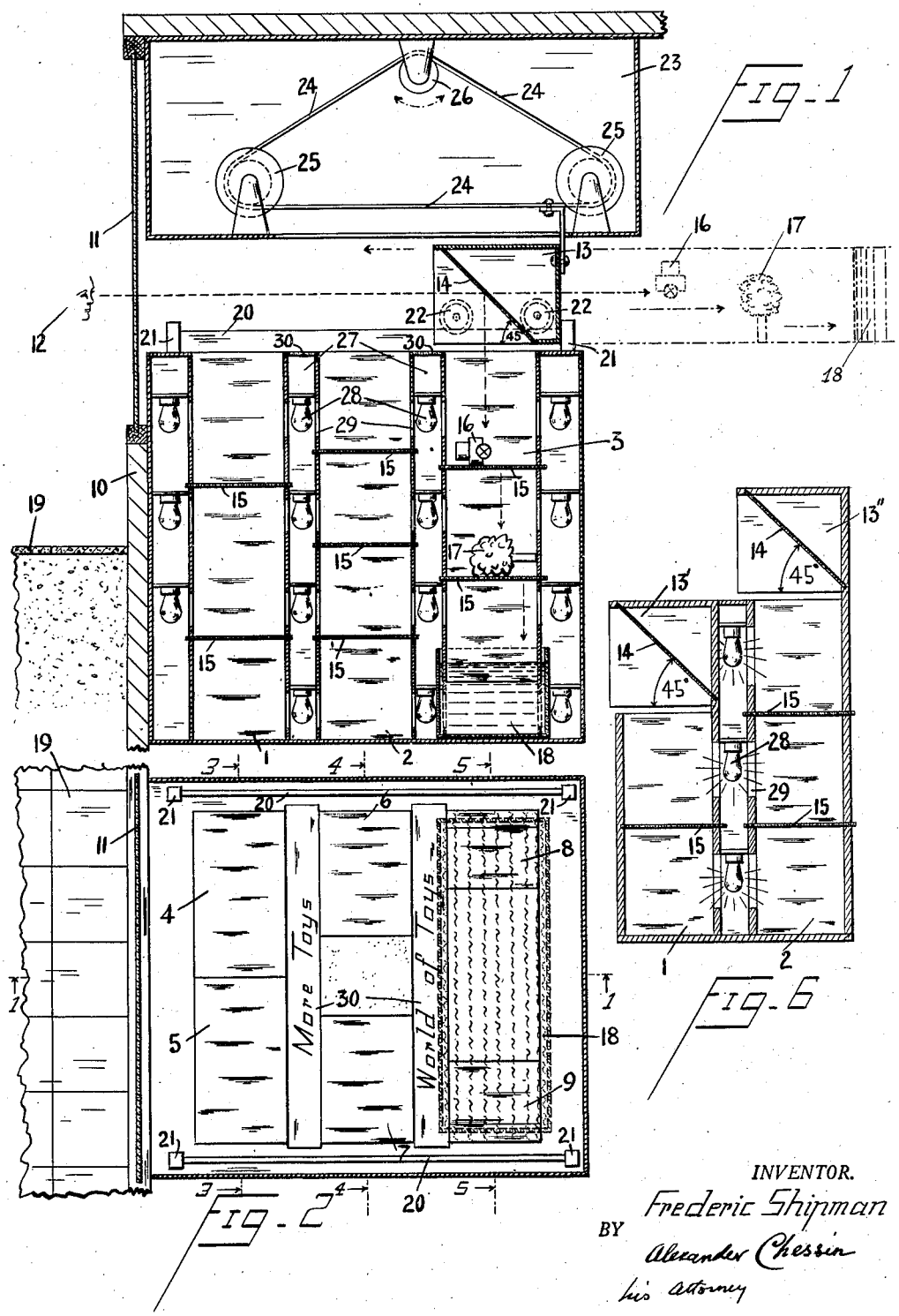
INVENTOR.
Frederic Shipman
BY Alexander Chessin
his attorney

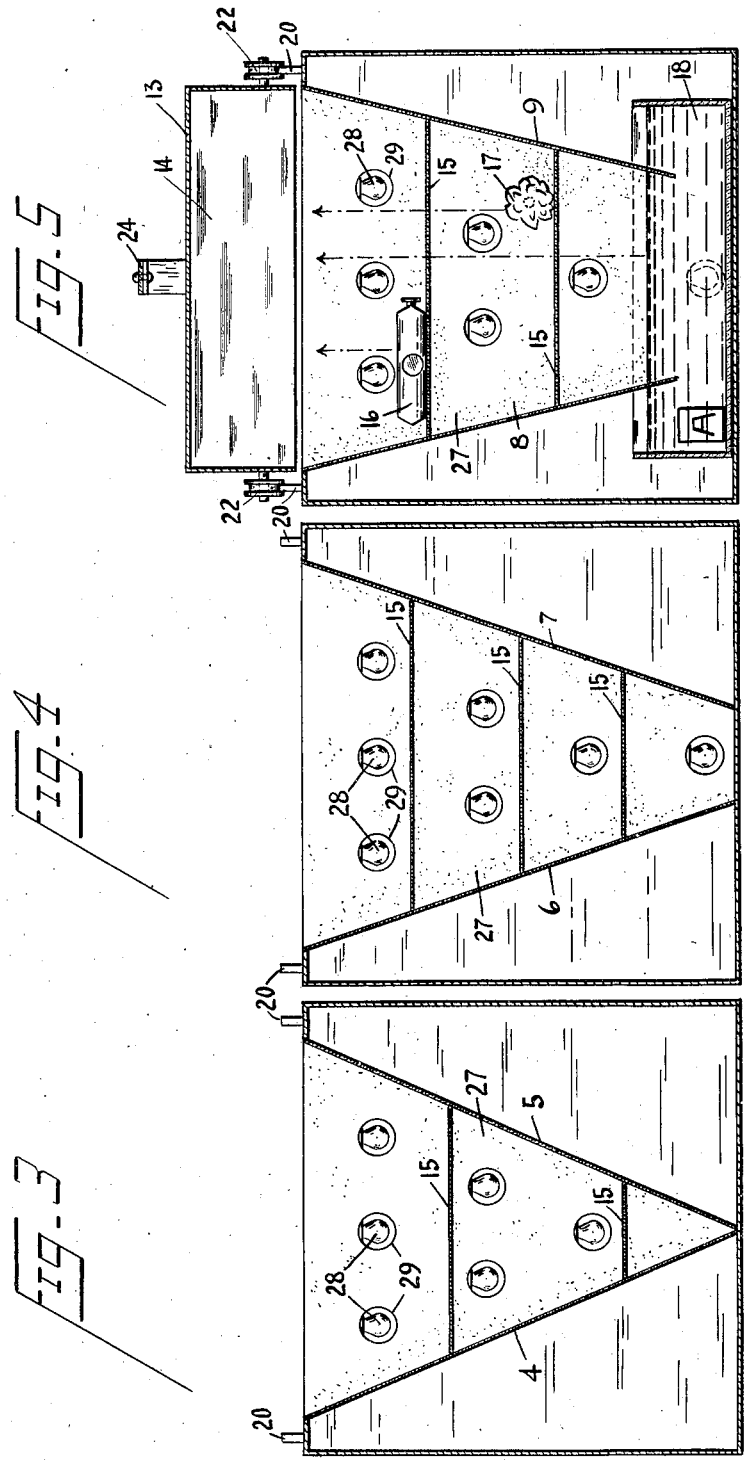

Patented Mar. 4, 1947

2,416,666

UNITED STATES PATENT OFFICE 2,416,666

WINDOW MIRROR DISPLAY

Frederic Shipman, New York, N. Y.

Application July 6, 1944, Serial No. 543,629

12 Claims. (Cl. 272—13)

1

The invention relates to amusement or advertising displays in which kaleidoscopic effects of mirrors are a dominant feature.

Where there is ample space within which the display is to be executed, little difficulty presents itself in the disposition and arrangement of the mirrors to obtain desired results. But when the display must be executed within an enclosure of limited space, the solution of the problem requires some ingenuity. It is an object of the present invention to solve this problem, especially for the case where the limited enclosure is behind a store window. It is also an object of the invention to automatically diversify the effects in the same display. A further object is to enable one to produce interesting and rather unusual effects. Other objects will become apparent from the specification which follows and from the accompanying drawing, in which Figure 1 is a vertical cross section of a preferred embodiment of my invention taken along the line 1—1 of Figure 2, which is a top plan view of this embodiment when looked down upon after the movable chamber on top and the mechanism for creating the motion of the chamber is omitted from the device. Figures 3, 4 and 5 are cross sections taken along the lines 3—3, 4—4 and 5—5 respectively of Figure 2. Figure 6 is a modification of the device, shown in cross section similar to Figure 1.

Referring to the figures in detail, 1, 2 and 3 are three cabinets of equal height, open at the top and arranged one behind the other tandem fashion. In cabinet 1 are two mirrors 4 and 5, forming a V with the apex of the V at the bottom. In cabinet 2 are two mirrors 6 and 7 inclined to one another in such a manner as to also form a V with the apex at the bottom, if the mirrors were extended downward, but here shown as forming a truncated V. Cabinet 3 has two mirrors 8 and 9 arranged in a manner similar to that of cabinet 2, except that the mirrors dip into a body of water 18. All of these mirrors 4, 5, 6, 7, 8 and 9 are perpendicular to the front of the device, as defined by the outer wall 10 and window 11. How much of the frontage is devoted to the wall and how much to the window is a matter of choice dictated by circumstances in each case. At various heights, transparent shelves 15 are secured intermediate these mirrors to support various articles placed on the shelves, such as the articles 16 and 17. A body of water 18 is placed at the bottom of cabinet 3. Means are provided for agitating this water. Any one of the numerous well known devices for agitating the

2 water in the reservoir may be used, such means being here schematically indicated by the letter A. While the articles placed on the shelves 15 are here shown only in cabinet 3, obviously, the same or other articles may be placed on the shelves of the other cabinets, to be reflected by the mirrors and creating various illusions as will be readily understood by those familiar with the art.

On the top of cabinets 1, 2 and 3, a chamber 13 moves back and forth. This reciprocating motion may be accomplished in any one of the many well known ways, such, for instance, as the chain or belt 24 running over the pulleys 25 and 26, the latter being actuated by a reciprocating motor, not shown. The chamber 13 is attached to the belt or chain 24 and runs on wheels 22 over tracks 20. Safety stops 21 are provided for the chamber 13. The entire mechanism is contained in a separate compartment 23. This particular arrangement of the moving mechanism has been adopted here only because of its convenience in so far as saving of drawing space is considered. Clearly, this or any equivalent mechanism may be differently located, the choice depending on the disposition of the several elements going into the construction of the device in each particular case, such as the available space above and below the device, the position and dimensions of the window, etc.

The chamber 13 has an open front and an open bottom, the latter registering with the open tops of the cabinets 1, 2 and 3, as it moves over them. A mirror 14 is set in the chamber 13 at an angle of 45 degrees to the horizontal plane. To an observer 12, standing on the pavement 19 in front of the window 11 and looking through the window 11 into the open front of the chamber 13, the articles lying prone on the shelves 15, together with their reflections in the mirrors 4, 5, 6, 7, 8 and 9, will appear in upright position at various distances, as indicated by arrows in Figure 1, the display changing as the chamber passes from one cabinet to another. The reflected articles will appear as if moving upward or downward according as the chamber moves away from or nearer to the window 11. The reflections have been omitted in the drawing to avoid confusion. The number of these reflections depends on the angle of the V formed by the mirrors and is the greater, the smaller this angle, becoming infinite when this angle is zero, i. e. when the mirrors are parallel.

The three cabinets are separated by double partitions 27, between the walls of which lighting fixtures 28 are secured, preferably so as to throw the light between any two shelves through openings 29 in the walls provided in the partitions for this purpose. On top of the partitions 27 are strips 30 adapted to carry additional displays, such as advertising slogans.

It readily will be seen that the invention opens up a wide and novel field of amusement and advertising displays, where lack of available space prevents the use of mirrors which require considerable space for their manifestations.

When still less space is available, I may restrict the series of cabinets to only a pair of them, as shown in Figure 6, or I may use a single cabinet similar to the two shown in Figure 6. In this case, the movable chamber 13 is replaced by a stationary chamber 13' when there is but one cabinet, or stationary chambers 13' and 13'' when there are two cabinets. In the case of two cabinets, the two chambers 13' and 13'' are at different heights.

While the mirrors in cabinet 1 form a complete V and a truncated V in cabinets 2 and 3, clearly, all or any of the mirrors in any one of the cabinets may be formed into complete or truncated V formations.

It should be understood that the invention is not limited to any specific number of cabinets. Thus, the arrangement shown in Figures 1–5 may be extended to a series of many more cabinets than here shown, whereby the total effect is greatly enlarged and diversified, the only limitation being the available space.

The essence of the invention is set forth in the following claims.

I claim:

1. A mirror display consisting of an open top cabinet, a couple of mirrors in said cabinet inclined to two of the opposite side walls of said cabinet and formed into a V with the apex of the V at the bottom, transparent shelves intermediate said mirrors at various heights, means disposed along the other side walls of said cabinet for illuminating its interior, a chamber on top of said cabinet having an open front and an open bottom, and a mirror in said chamber at an angle of 45 degrees to the horizontal and perpendicular to said first mentioned side walls, whereby any article lying prone on one of said shelves, together with all of its reflections, appears in an upright position to an observer looking through the open front of said chamber.

2. A mirror display consisting of a plurality of open top cabinets of different heights arranged tandem fashion one behind the other, a couple of mirrors in each cabinet inclined to two of the opposite side walls of said cabinet and forming a complete or truncated V with the apex of the V at the bottom, transparent shelves intermediate said mirrors at various heights, a chamber on top of each cabinet having an open front and an open bottom registering with the open top of the cabinet, and a mirror in each cabinet inclined at an angle of 45 degrees to the horizontal and perpendicular to said side walls, whereby objects lying on said shelves, together with their reflections, appear in proper positions to an observer looking through the open front of any one of said chambers.

3. A mirror display comprising a series of open top cabinets of equal height, arranged tandem fashion one behind the other, a couple of mirrors in each cabinet inclined to two of the opposite side walls of the cabinet and forming a complete or truncated V with the apex of the V at the bottom, transparent shelves intermediate said mirrors at various heights, illuminating means disposed between the other sides of said cabinets, a chamber having an open front and an open bottom registrable with the open tops of said cabinets reciprocatingly movable on top of said cabinets, and a mirror in said chamber perpendicular to said first mentioned side walls at an angle of 45 degrees to the horizontal, whereby objects lying prone on said shelves, together with their reflections in said cabinet mirrors, appear in an upright position to an observer looking into the open front of said chamber.

4. A device according to claim 1, wherein the mirrors in the cabinets are perpendicular to the front as defined in said claim.

5. A device according to claim 2, wherein the mirrors in the cabinets are perpendicular to the front as defined in said claim.

6. A device according to claim 3, wherein the mirrors in the cabinets are perpendicular to the front as defined in said claim.

7. A device according to claim 3, wherein the cabinets are separated by double partitions and the illuminating means are disposed between the side walls of said partitions, and openings are provided in said walls for the passage of light therethrough.

8. A window mirror display comprising a series of cabinets of equal height arranged tandem fashion one behind the other, said cabinets being impervious to direct view through said window, but open at the top, a couple of mirrors in each cabinet inclined to one another to form a complete or truncated V with the apex of the V at the bottom, transparent shelves intermediate the mirrors of each cabinet at various heights, double partitions separating said cabinets, illuminating means between the side walls of said double partitions, openings in said side walls for the passage of light therethrough, at least one light being provided between two consecutive shelves, rails on top of said cabinets, a chamber in alignment with said window having an open front and an open bottom reciprocatingly movable on said rails, and a mirror in said chamber at an angle of 45 degrees to the horizontal, whereby objects lying prone on said shelves appear in upright position to an observer looking through said window into the open front of said chamber.

9. A device according to claim 8, wherein one of the objects on a shelf is a body of water, and means are provided for agitating the water.

10. A device according to claim 8, wherein strips are provided on top of the double partitions for additional display purposes.

11. A window mirror display comprising a series of open top cabinets of equal height arranged tandem fashion one behind the other, a couple of mirrors in each cabinet inclined to one another to form a complete or truncated V with the apex of the V at the bottom, transparent shelves intermediate the mirrors of each cabinet at various heights, means disposed along the side walls of said cabinets for illuminating their interiors, a chamber in alignment with said window having an open front and an open bottom, means for moving said chamber over said cabinets, and a mirror in said chamber at an angle of 45 degrees to the horizontal, whereby objects lying prone on said shelves appear in upright position to an observer looking through said window into the open front of said chamber.

12. A mirror display consisting of an open top cabinet, a couple of mirrors in said cabinet formed into a V with the apex of the V at the bottom, transparent shelves intermediate said mirrors at various heights, articles lying on said shelves, means for illuminating said articles, a chamber on top of said cabinet having an open front and an open bottom, and a mirror in said chamber at an angle of 45 degrees to the horizontal, whereby said articles together with all of their reflections appear in a position turned by 90 degrees to an observer looking through said window into the open front of said chamber.

FREDERIC SHIPMAN.

REFERENCES CITED

The following references are of record in the file of this patent:

UNITED STATES PATENTS

| Number | Name | Date |
|---|---|---|
| 978,215 | Rotherham | Dec. 13, 1910 |
| 1,965,875 | Behymer | July 10, 1934 |
| 1,740,842 | Steen | Dec. 24, 1929 |
| 2,165,736 | Twele | July 11, 1939 |
| 2,109,586 | Einbinder | Mar. 1, 1938 |
| 2,122,496 | Simjian | July 5, 1938 |
| 2,106,839 | Gilbert | Feb. 1, 1938 |

FOREIGN PATENTS

| Number | Country | Date |
|---|---|---|
| 274,900 | British | Mar. 8, 1928 |